Nov. 27, 1951  F. J. YOUNG  2,576,872
ROTARY DRILLING RIG
Filed Oct. 28, 1946  4 Sheets-Sheet 1

Inventor
Forrest J. Young
By Lyon & Lyon
Attorneys

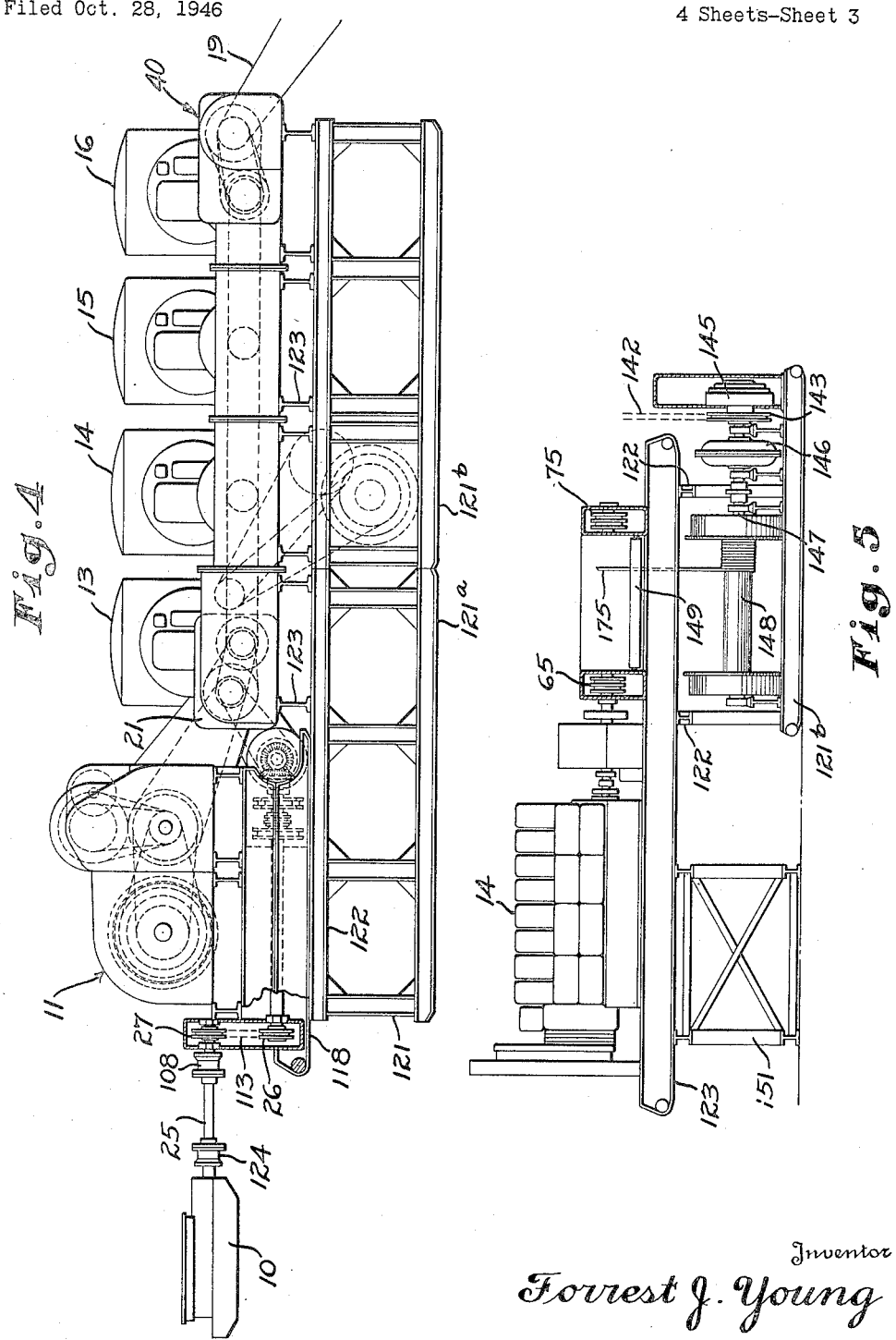

Nov. 27, 1951     F. J. YOUNG     2,576,872
ROTARY DRILLING RIG
Filed Oct. 28, 1946     4 Sheets-Sheet 4
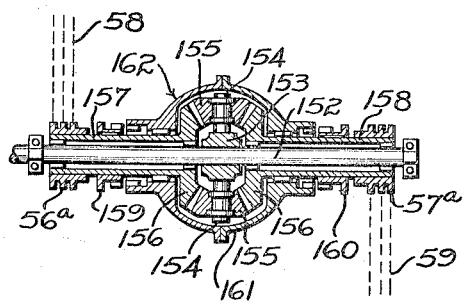
Fig. 8
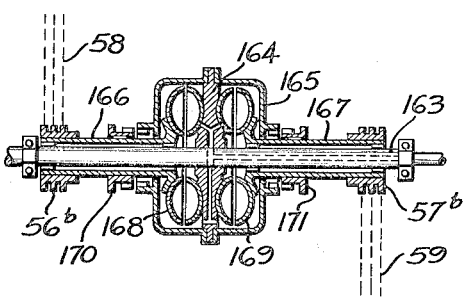
Fig. 9
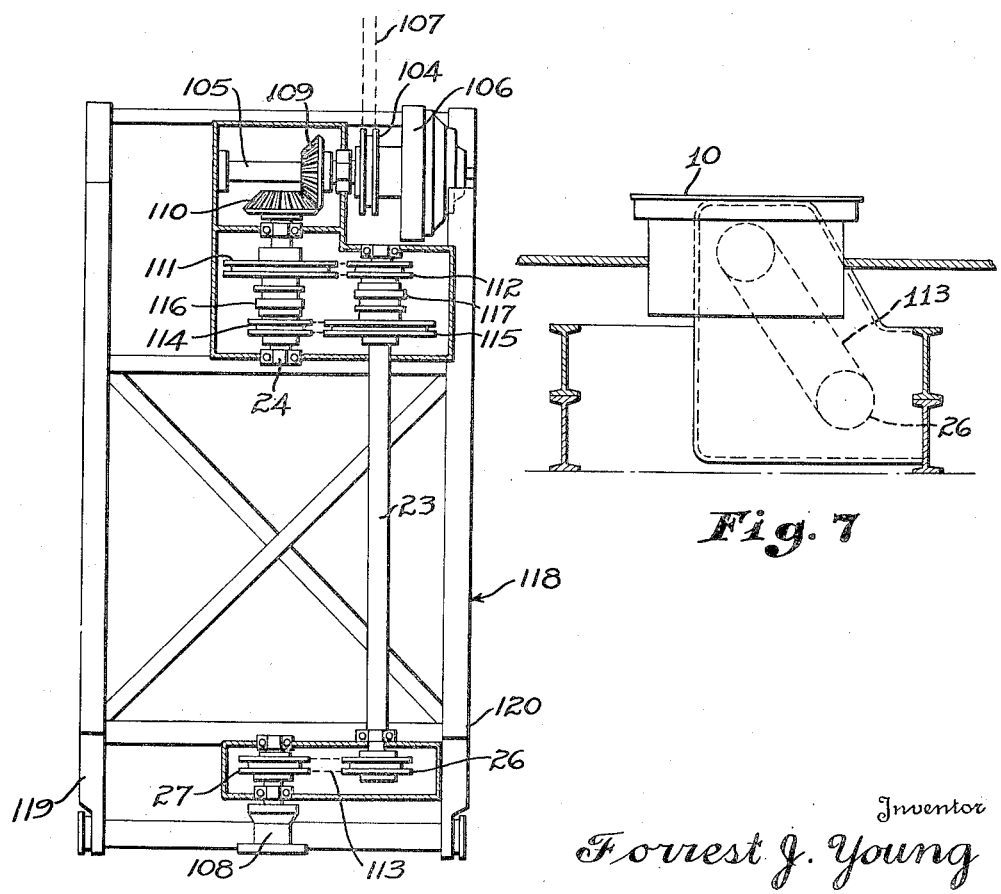
Fig. 7
Fig. 6
Inventor
Forrest J. Young
By Lyon & Lyon
Attorneys Patented Nov. 27, 1951

2,576,872

UNITED STATES PATENT OFFICE 2,576,872

ROTARY DRILLING RIG

Forrest J. Young, Los Angeles, Calif., assignor to The National Supply Company, Pittsburgh, Pa., a corporation of Pennsylvania Application October 28, 1946, Serial No. 706,140

11 Claims. (Cl. 255—19)

This invention relates to apparatus of the type used in the drilling of oil, gas, water or other wells and is particularly directed to a rotary drilling rig and multiple engine power plant of novel construction and arrangement, for high speed, heavy duty drilling operations.

An important object of this invention is to provide a drilling rig having a drawworks powered by a plurality of engine units, and a pair of change speed transmissions interposed between the engine units and the drawworks, with provision for driving either transmission from any one of the engine units.

Another object is to provide such an arrangement wherein the change speed transmissions may be conjointly operated in unison for driving the drawworks from the combined power of the several engine units.

Another object is to provide a hoisting engine unit normally adapted to drive the drawworks through one change speed transmission, and a rotary drive engine unit normally adapted to drive the rotary machine through another change speed transmission, with provision for driving either change speed transmission from either engine unit or for combining the power of both engine units for conjoint operation of both change speed transmissions to drive the drawworks.

Another important object of this invention is to provide a rotary drilling rig having a pair of positive displacement reciprocating pumps for circulating mud fluid, each of the pumps being independently driven from separate engine units, together with a third engine unit connected through a power dividing device to assist in driving both pumps simultaneously.

Another object is to provide such an arrangement in which the power dividing device takes the form of a differential drive unit or a hydraulic coupling of the kinetic type.

A further object is to provide a novel form of drive for operating the rotary machine.

Another object is to provide a sand reel for a heavy duty rotary drilling rig mounted in a novel location beneath a portion of the power plant and having the sand line extending through an opening in the power plant floor.

Other objects and advantages will appear hereinafter.

In the drawings:

Figure 4 is a side elevation of the apparatus shown in Figure 1, the pumps being omitted.

Figure 5 is a side elevation taken substantially on the line 5—5 as shown in Figure 1.

Figure 6 is a plan view of a unitary portion of the apparatus used for driving the rotary machine.

Figure 7 is an end elevation of the rotary machine shown in Figures 1 and 3.

Figure 8 is a sectional plan view of a differential drive unit employed in connection with a modified form of my invention.

Figure 9 is a view similar to Figure 8 illustrating a hydraulic coupling of the kinetic type employed in connection with another modification of my invention.

Figure 1:
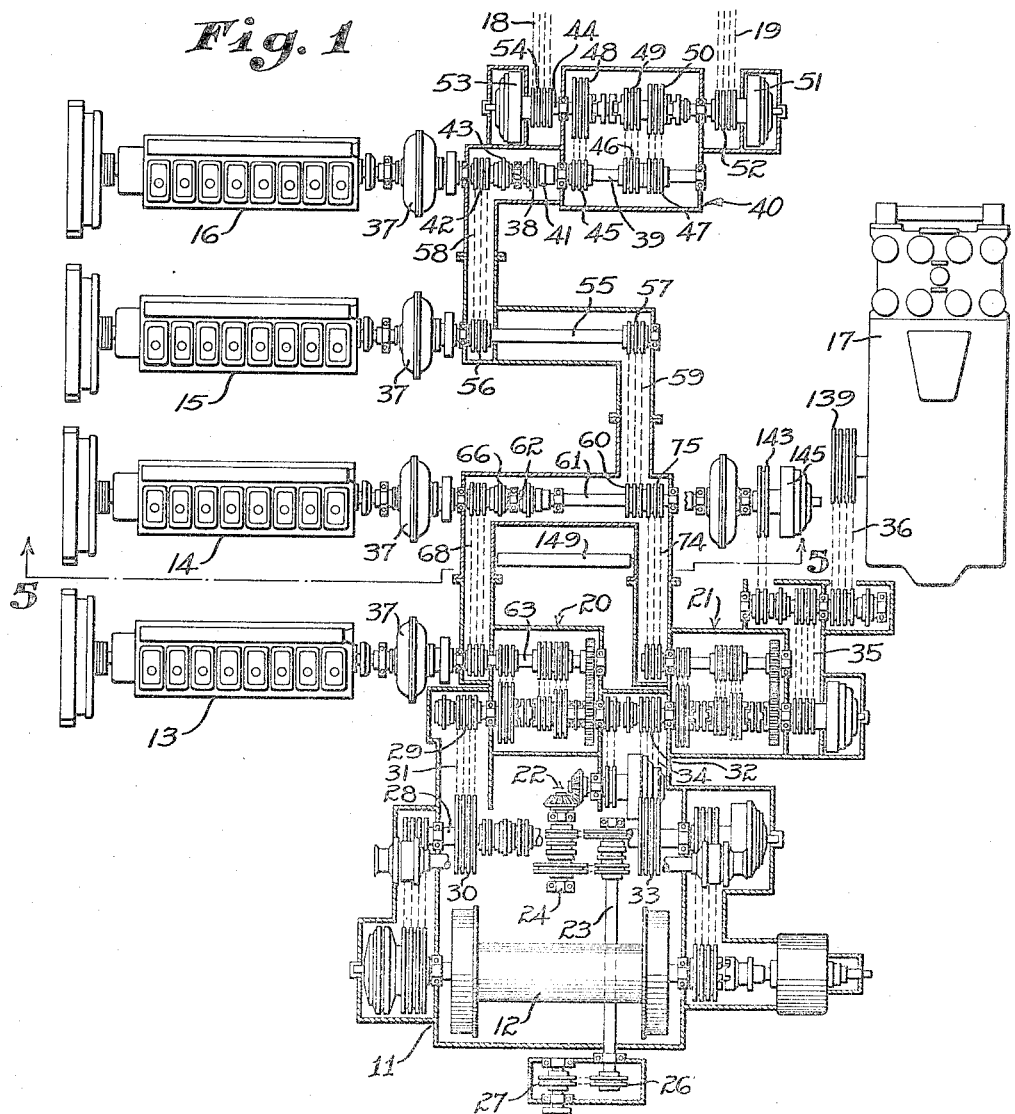
Figure 1 is a plan view in diagrammatic form showing a preferred embodiment of my invention.

Referring to the drawings, the rotary drilling rig embodying my invention includes a rotary machine 10, a hoisting unit or drawworks 11 having a spooling drum 12, a power plant including a plurality of engine units 13, 14, 15 and 16, and a plurality of reciprocating pumps 17 of the positive displacement type for circulating mud fluid in the drilling operation. Only one pump 17 is illustrated in the drawings, but it is to be understood that additional pumps of the same or other design are driven from the multiple strand drive chains 18 and 19.

A rotary drive change speed transmission unit 20 and a similar pump drive chain speed transmission unit 21 are provided adjacent the drawworks 11 and are arranged to be driven independently or conjointly by means of the engine units 13, 14, 15 and 16. Means are provided for driving the rotary machine 10 from the change speed transmission 20 and, as shown in the drawings, this means includes a right angle drive assembly 22 adapted to drive an intermediate shaft 23 from a countershaft 24. The shaft 23 operates the rotary drive shaft 25 by means of the aligned sprockets 26 and 27.

Additional means are provided whereby the transmission 20 may operate the drawworks drive shaft 28. As shown in the drawings, this means includes a sprocket 29 adapted to drive the sprocket 30 by means of a multiple strand chain 31. The transmission 21 is similarly adapted to drive the drawworks drive shaft 28 through aligned sprockets 32 and 33 which are connected by multiple strand chain 34. The transmission 21 also may drive the pump 17 by way of multiple strand chains 35 and 36.

Proceeding from this general description of the major units incorporated in the preferred embodiment of my invention to a more detailed description of the construction of the various parts of the apparatus, each of the engine units 13, 14, 15 and 16 is adapted to deliver power through a hydraulic coupling of the kinetic type 37. These couplings may be of any conventional type but are preferably of the form shown in the Archer, et al., Patent No. 2,164,173, granted June 27, 1939. The coupling 37 associated with the engine unit 16 is adapted to drive a power shaft 38. The drive shaft 39 of the change speed transmission unit 40 is adapted to be releasably connected to the power shaft 38 by means of the splined clutch 41. The sprocket 42 is rotatably mounted on the shaft 38 and may be clutched into direct driving engagement by means of the splined clutch 43. Change speed drive means are provided between the drive shaft 39 and the power takeoff shaft 44 and these means may take the form of sprockets 45, 46 and 47 fixed on the shaft 39 and adapted to drive the aligned sprockets 48, 49 and 50, which are rotatably mounted on the power take-off shaft 44. Clutch means are provided for selectively engaging the latter said sprockets to the shaft 44 in order that it may be driven from the shaft 39.

A friction clutch 51 is provided on one end of the shaft 44 for driving a pump (not shown) from the sprocket 52 and multiple strand chain 19 and, similarly, another friction clutch 53 is provided for releasably engaging the sprocket 54 with the shaft 44 for driving another pump (not shown) through the multiple strand chain 18. It will be understood from this description that either or both of the pump drive chains 18 and 19 may be operated from the power shaft 38.

Engine unit 15 is adapted to drive power shaft 55 through its hydraulic coupling 37 and fixed on the opposite ends of the shaft 55 are drive sprockets 56 and 57. A multiple strand chain 58 connects sprockets 56 and 42 and a multiple strand chain 59 connects the sprocket 57 in driving relation with sprocket 60 fixed on the stub shaft 61. The stub shaft 61 is adapted to be connected in driving relation with the power shaft 62, which is driven from the engine unit 14 through the hydraulic coupling 37. The transmission shaft 63 is adapted to be driven from the engine unit 13 through its respective hydraulic coupling 37.

Figure 3:
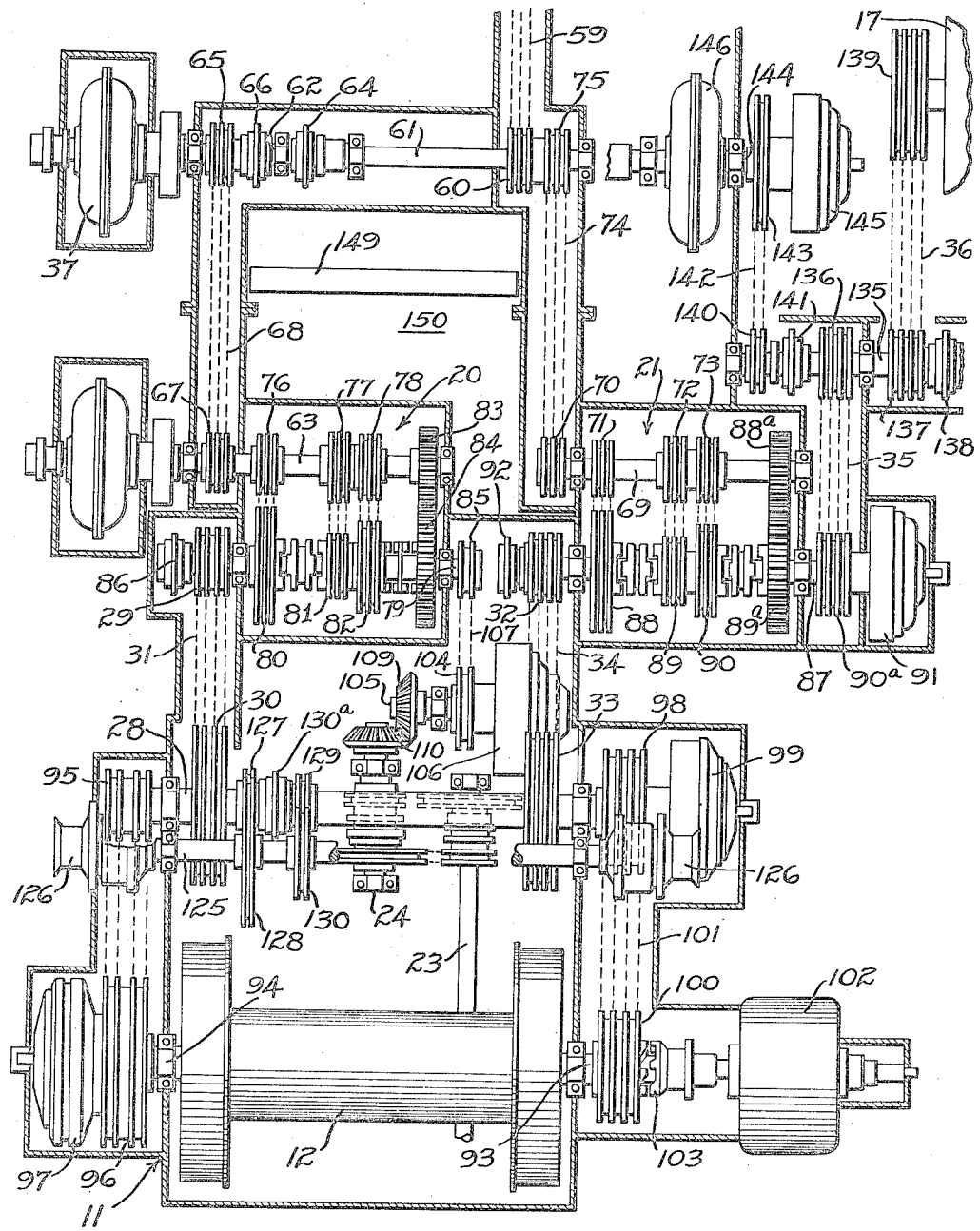
Figure 3 is a plan view of a portion of the apparatus shown in Figure 1 and illustrated on a larger scale.

Referring to Figure 3, the power shaft 62 may be releasably connected in driving relation with the stub shaft 61 by means of the splined clutch 64, and may be connected in direct driving relation with the sprocket 65 by means of the splined clutch 66. A sprocket 67 fixed on the transmission shaft 63 is connected in driving relation to the sprocket 65 by means of the multiple strand chain 68. Fixed on the shaft 69 of the change speed transmission unit 21 are sprockets 70, 71, 72 and 73. Sprocket 70 is connected by multiple strand chain 74 to sprocket 75, which is fixed on the stub shaft 61. Similarly, sprockets 76, 77 and 78 are fixed on the shaft 63 of the change speed transmission unit 20.

A power take-off shaft 79 of the transmission 20 rotatably supports sprockets 80, 81 and 82, each of which is provided with suitable clutch means for engagement in driving relation with the shaft 79. Aligned sprockets 76—80, 77—81 and 78—82 are each connected by chains in order to make available three speeds of the shaft 79 for each speed of the shaft 63. Reversing gears 83 and 84 are provided for reversing the direction of rotation of the shaft 79 when desired. Fixed on one end of the shaft 79 is the rotary drive sprocket 85 and rotatably mounted on the other end of the shaft 79 is the drawworks drive sprocket 29 adapted to be engaged with the shaft 79 by means of the axially shiftable splined clutch 86. Multiple strand chain 31 enables the shaft 79 to drive the drawworks drive shaft 28 via the sprockets 29 and 30.

The power take-off shaft 87 of the change speed transmission unit 21 rotatably supports sprockets 88, 89 and 90 and each of the sprockets is provided with selectively operable clutch means for engagement with the shaft 87; thus three speeds are provided between the shaft 69 and the shaft 87. Reversing gears 88a and 89a are provided for reversing the direction of rotation of the shaft 87 when desired.

Rotatably mounted on one end of the shaft 87 is the sprocket 90a which is adapted to be releasably engaged with the shaft 87 by means of the friction clutch 91. The drive sprocket 32 is rotatably mounted on the other end of the shaft 87 and is adapted to be engaged therewith by means of the shiftable splined clutch 92. The power take-off shaft 87 may therefore drive the drawworks drive shaft 28 through the sprockets 32 and 33 and multiple strand chain 34.

The drawworks 11 is provided with a drum shaft 93 on which spooling drum 12 is secured. Axially spaced bearings 94 maintain the shaft 93 in operative position. A low speed drive from the drive shaft 28 to the drum shaft 93 is provided and, as shown in the drawings, this includes the sprocket 95 secured on one end of the drive shaft 28 and adapted by means of multiple strand chain to drive the sprocket 96 rotatably supported on one end of the drum shaft 93. A friction clutch 97 is provided for releasably engaging the sprocket 96 in direct driving relation with the drum shaft 93.

A high speed drive is provided between the drive shaft 28 and drum shaft 93 and as shown in Figure 3, this includes a sprocket 98 rotatably supported on the other end of the drive shaft 28 and adapted to be connected in driving relation therewith by means of the friction clutch 99. A driven sprocket 100 is fixed on the drum shaft 93 and is adapted to be driven from the sprocket 98 by means of the multiple strand chain 101. A hydraulic brake 102, which may be of the general type illustrated in De La Mater Patent No. 1,992,911, is arranged coaxially of the drum shaft 93 and may be selectively connected therewith by means of the clutch 103.

Figure 2:
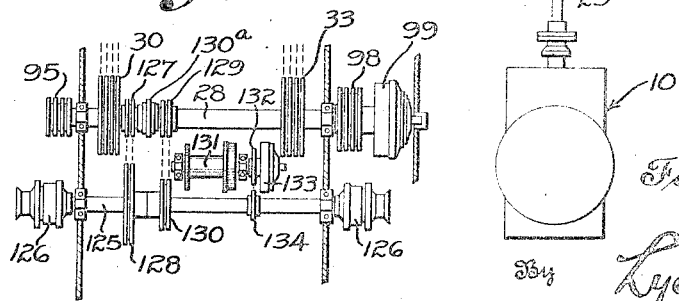
Figure 2 is a fragmentary plan view, partly in section, showing details of drawworks elements omitted in Figure 1.

A cat shaft 125 is positioned parallel to the drive shaft 28 and drum shaft 93 and carries a cathead 126 at the end thereof which may be of the type described in the copending application of Spencer W. Long, Serial No. 669,518, filed May 14, 1946. A two-speed drive is provided from the drive shaft 28 to the cat shaft 125 and this includes aligned sprockets 128 and 130. Sprockets 128 and 130 are fixed on the shaft 125 and sprockets 127 and 129 are rotatably mounted on the drive shaft 28 as shown clearly in Figure 2.

A shiftable splined clutch 130a is adapted to connect either sprocket 127 or 129 in driving relation with the drive shaft 28. If desired an auxiliary drum 131 for general hoisting purposes may be provided which is rotatably mounted and adapted to be driven by sprocket 132 and friction clutch 133. A drive sprocket 134 fixed on the cat shaft 125 is adapted to drive the sprocket 132. The drum 131 has been omitted from Figures 1 and 3 for clarity of illustration.

Means are provided for driving the rotary machine from the change speed transmission unit 20 and, as shown in Figures 3, 4 and 6, the sprocket 85 on the power take-off shaft 79 drives the sprocket 104, which is rotatably mounted on the clutch shaft 105 and is adapted to be connected in driving engagement therewith by means of the friction clutch 106. The multiple strand chain 107 connects the sprockets 85 and 104. A countershaft 24 is rotatably supported at right angles to the shaft 105 and is adapted to be driven therefrom by means of bevel gears 109 and 110, which are fixed on the shafts 105 and 24 respectively.

Also fixed on the shaft 24 is the sprocket 111 which is adapted to drive the sprocket 112 rotatably mounted on the intermediate shaft 23. Another sprocket 114 is rotatably mounted on the shaft 24 and is adapted to drive the sprocket 115, which is fixed on the shaft 23. Splined clutches 116 and 117 are provided for selectively engaging the sprockets 114 and 112 to their respective shafts. The sprockets and clutches just described provide a two-speed drive between the countershaft 24 and the intermediate shaft 23.

The multiple strand chain 113 connects sprockets 26 and 27 for driving the rotary drive shaft 25 through a flexible coupling 108. The rotary machine 10 is driven from the shaft 25 by means of the flexible coupling 124. The rotary machine is supported by a portion of the drilling rig derrick (not shown).

The shafts 23, 24 and 105 are rotatably supported in bearings carried on an intermediate supporting unit generally designated 118. This intermediate supporting unit 118 comprises a unitary assembly and is provided with skid members 119 and 120 for transportation as a separate unit. As shown in Figure 4, the unit 118 is interposed between the drawworks 11 and the subbase 121. The subbase 121 includes a pair of horizontal parallel beams 122 for supporting the unit 118 and the change speed transmission units 20 and 21. The subbase assembly 121 may be separated into two separate units 121a and 121b aligned end to end and separable for purposes of portability. The power plant including the shafts driven by the individual engines is supported on transverse beams 123 which rest on the longitudinal beams 122 of the subbase 121.

From the above description it will be understood that the change speed transmission unit 20 is adapted to drive either the rotary machine 10 or the drawworks 11. Similarly, the change speed transmission unit 21 is adapted to drive the drawworks 11 and is also adapted to drive the countershaft 135 through sprockets 90a and 136 by way of multiple strand chain 35. The sprocket 136 is fixed on the countershaft 135. Sprocket 137 is rotatably mounted on the countershaft 135 and is adapted to be engaged in driving relation therewith by means of the splined clutch 138. The multiple strand chain 36 connects sprocket 137 to the pump drive sprocket 139 adapted to operate the pump 17.

A drive sprocket 140 is rotatably mounted on the countershaft 135 and is adapted for selective engagement therewith by means of the splined clutch 141. A multiple strand chain 142 connects the sprocket 140 to the sprocket 143 rotatably mounted on the stub shaft 144. A friction clutch 145 is provided for connecting the sprocket 143 with the shaft 144. A hydraulic brake 146 of the kinetic type is mounted on the shaft 144 to provide a supplementary braking medium for the sand reel shaft 147 (see Figure 5).

A drum 148 is fixed on the sand reel shaft 147 and a sand line 175 is adapted to be spooled upon the drum 148. The sand line is adapted to extend upwardly from the spooling drum 148 through an opening 149 in the floor plate 150 of the power plant. This opening 149 is positioned between the chains 68 and 74 and between the shafts 61 and 63. Positioning of the sand reel within the subbase unit 121b provides a location which is out of the way during normal drilling operations, yet which is readily accessible for service or repair of the sand reel shaft 147 and its associated mechanism. It will be understood by those familiar with this art that the sand reel is not used during normal drilling operations but is required for such operations as bailing out a drilled hole or for running certain auxiliary equipment into the hole at intervals during or upon completion of the drilling process. Since the present invention is directed to a rotary drilling rig capable of drilling the deepest wells, the amount of sand line required for servicing such deep wells requires a very large drum 148 in order that the line may extend from the surface to a point adjacent the bottom of the drilled hole. The problem of locating this sand line drum for ready operation by the power plant and yet in a position to avoid interference with regular drilling operations has been solved by locating the drum 148 at a position beneath the power plant and by utilizing the supporting structure for the power plant as a frame for mounting the sand reel assembly. The sand line itself is then extended through an opening in the floor of the power plant at a position which is not occupied by component parts of the power plate.

A suplementary subbase 151 which is positioned parallel with the subbase 121 is provided for supporting the engine units 13, 14, 15 and 16. The term "engine units" has been used in this specification rather than the term "engines" since it is recognized that it is possible to substitute a plurality of small engines arranged for operation as a unit instead of large single engines of high horsepower capacity.

In operation, the drilling engine 13 normally operates a rotary machine 10 by way of the change speed transmission unit 20 and the right angle drive assembly 22. The hoisting engine 14 is available for operating the transmission unit 21 through which may be driven either the drawworks 11 or the pump 17 via the chains 35 and 36. Normally engines 15 and 16 may be compounded for operating the pump drives 18 and 19. The arrangement and position of clutches are such, however, that all four engines, or any combination of them, may be used for driving the drawworks; thus, engine units 13 and 14 may be compounded through chain 68 to drive the sprocket 30 on the drawworks by way of transmission 20 and at the same time engine units 15 and 16 may be compounded through chains 58 and 59 and 74 to drive the sprocket 33 on the drawworks drive shaft by way of the transmission 21. The power take-off shafts of the transmission units 20 and 21 are axially aligned. Sprockets 29 and 32 have the same number of teeth and the sprockets 30 and 33 have the same number of teeth. The chains 31 and 34 have the same number of links; consequently, the drives connecting the transmissions 20 and 21 with drawworks drive shaft 28 are substantially identical and, therefore, a smooth application of power is provided without hunting, backlash, or "fighting" between the two drives. The power plant is sufficiently flexible so that any one of the engine units may be left inoperative or may be shut down for repairs without seriously affecting operation of the drilling rig as a unit. If desired, rotary drive engine unit 13 may drive the transmission unit 21 via the chain 68, shaft 61 and chain 74; also the hoisting engine unit 14 may be used to operate the transmission 20 by engaging the splined clutch 66 to render the chain drive 68 effective.

The modification shown in Figure 8 includes an assembly which is adapted to be substituted for the shaft 55 and sprockets 56 and 57 as shown in Figure 1. The shaft 152 is arranged to be driven by the engine unit 15 and fixed to this shaft is a spider 153. A plurality of radially extending trunnions 154 on the spider each rotatably support a pinion gear 155. The pinion gears 155 mesh with driven gears 156 which are rotatably supported on the shaft 152 and the arrangement of parts is such that a differential drive mechanism is provided between the shaft 152 and the driven gears 156. Drive sprockets 56a and 57a are fixed on the sleeve extensions 157 and 158, which in turn may be integrally formed with the gears 156 respectively.

Axially shiftable clutches 159 and 160 are provided for selectively engaging the sleeve extensions 158 respectively in driving engagement with the housing 161. When the clutches 159 and 160 are engaged the differential mechanism is locked out and the assembly functions in an identical manner to the assembly of shaft 55 and sprockets 56 and 57 as shown in Figure 1.

When the clutches 159 and 160 are disengaged, power supplied to the shaft 152 by the engine unit 15 is divided by the differential mechanism generally designated 162 so that a portion thereof drives the chain 58 and another portion drives the chain 59 in accordance with the relative resistance offered by each of these drive chains. Therefore, when the engine unit 14 is driving the pump 17 through the drive chain 36, and while engine unit 16 is operating one or both of the chain drives 18 and 19, the engine unit 15 may be used to supplement the power of the other engine units by dividing its power output through the differential mechanism 162.

In certain drilling operations where it is desired to pump mud fluid under very high pressure, the pumps 17 are connected for series operation so that the fluid delivered from one pump is passed into the inlet of another pump. Such conditions of operation are known in the art as compounding pumps and this arrangement is shown clearly in the Archer Patent No. 2,282,597, granted May 12, 1942.

Owing the cyclic variations in pump speeds it is difficult to drive reciprocating pumps which are hydraulically connected in series and, therefore, considerable difficulty might be encountered in attempting to use the power of a third engine to supplement two other engines each individually driving a pump. The provisions of the differential mechanism 162 enables the third engine to be utilized when additional power is desired and to permit variations in the speed of the drives to the two pumps; thus, the spider 153 is driven from the shaft 152 at the speed of the engine unit 15, but the sprockets 56 and 57 are free to rotate at different speeds on this accompanying cyclic variation in speed.

In the further modification shown in Figure 9, the shaft 163 is adapted to be substituted for the shaft 55 with the sprockets 56b and 57b substituted for the sprockets 56 and 57. Fixed to the shaft 163 is a central impeller unit 164. A housing 165 is secured to this impeller unit and adapted to rotate therewith. Hydro-kinetic drive means of the Fottinger type is provided between the impeller unit 164 and the extension sleeves 166 and 167, which are rotatably mounted on the shaft 163. This drive means includes runners 168 and 169 which are secured to the extension sleeves 166 and 167 respectively. Hydraulic fluid within the housing 165 is caused to circulate in the toroidal channels formed between the double impeller 164 and the runners 168 and 169 with the result that the latter are caused to rotate when the unit 164 revolves.

In effect this device comprises a pair of hydraulic couplings interposed between the shaft 163 and the sprockets 56b and 57b which are fixed on the extension sleeves 166 and 167 respectively. When the engine unit 15 rotates the shaft 163 and the double impeller 164 the power of the engine is divided between chains 58 and 59, but the sprockets 56b and 57b may rotate at slightly different speeds and also may compensate for cyclic variations in the speed of the pumps. Clutches 170 and 171 are provided for engaging the extension sleeves 166 and 167 in direct driving relation with the housing 165 so that when the clutches are engaged the hydraulic drive is locked out and the device functions in a manner identical to the shaft 55 and sprockets 56 and 57 shown in Figure 1.

Having fully described my invention, it is to be understood that I do not wish to be limited to the details herein set forth, but my invention is of the full scope of the appended claims.

I claim:

1. In a drilling rig having a drawworks provided with a drum shaft, a rotary machine, and a power plant including a plurality of engine units each driving one of a plurality of parallel shafts, the combination of a unitary sub-base having parallel longitudinal beams supporting the drawworks and parallel shafts of the power plant, the engine units, parallel shafts and the drawworks drumshaft being positioned transversely of said longitudinal beams, an intermediate supporting unit interposed between the drawworks and the sub-base, an intermediate shaft mounted substantially parallel to said beams and carried in spaced bearings on said intermediate supporting unit, a driven shaft parallel to said intermediate shaft and connected to drive the rotary machine, means including endless flexible connections for driving the driven shaft from the intermediate shaft, a countershaft and a clutch shaft on said intermediate supporting unit, right angle drive means connecting the latter said shafts, means including a releasable clutch on the clutch shaft whereby the clutch shaft may be driven from one of said engines, means whereby the countershaft may drive the intermediate shaft, and means whereby the other engine may drive the drawworks.

2. In a drilling rig having a drawworks provided with a drum shaft, a rotary machine, and a power plant including a plurality of engine units each driving one of a plurality of parallel shafts, the combination of a unitary sub-base having parallel longitudinal beams supporting the drawworks and parallel shafts of the power plant units, the drawworks drumshaft and the engine units being mounted transverse thereto, an intermediate supporting unit interposed between the drawworks and the sub-base, a clutch shaft and an intermediate shaft rotatably supported on the intermediate unit, the intermediate shaft being substantially parallel to said beams and extending beneath the drum shaft, means including a right angle drive for driving the intermediate shaft from the clutch shaft, said means including a clutch on the clutch shaft whereby one of the engine units may drive the clutch shaft, means whereby another engine unit may drive the drawworks, a driven shaft parallel to the intermediate shaft and connected to drive the rotary machine, and means including endless flexible connections for driving the driven shaft from the intermediate shaft.

3. In a drilling rig having two power-driven units and a plurality of engine units, the combination of: first and second multi-speed transmissions, means whereby the first multi-speed transmission may be driven by either one of two of said engine units, means whereby the second multi-speed transmission may be driven by either one of two of said engine units, whereby said multi-speed transmissions may be independently driven at different speeds, power-transmitting connections selectively operable to connect the first multi-speed transmission to drive the first of said power-driven units, and additional power-transmitting connections selectively operable to connect the second multi-speed transmission to drive either of the power-driven units, whereby both multi-speed transmissions may operate conjointly to drive the first power-driven unit.

4. In a drilling rig having a drawworks and a rotary machine and a plurality of engine units, the combination of: first and second multi-speed transmissions, means whereby the first multi-speed transmission may be driven by either one of two of said engine units, means whereby the second multi-speed transmission may be driven by either one of two of said engine units, whereby said multi-speed transmissions may be independently driven at different speeds, power-transmitting connections selectively operable to connect the first multi-speed transmission to drive either the drawworks or the rotary machine, and additional power-transmitting connections selectively operable to connect the second multi-speed transmission to drive the drawworks, whereby both multi-speed transmissions may operate conjointly to drive the drawworks.

5. In a drilling rig having a drawworks and a slush pump and a plurality of engine units, the combination of: first and second multi-speed transmissions, means whereby the first multi-speed transmission may be driven by either one of two of said engine units, means whereby the second multi-speed transmission may be driven by either one of two of said engine units, whereby said multi-speed transmissions may be independently driven at different speeds, power-transmitting connections selectively operable to connect the first multi-speed transmission to drive the drawworks, and additional power-transmitting connections selectively operable to connect the second multi-speed transmission to drive either the drawworks or the slush pump, whereby both multi-speed transmissions may operate conjointly to drive the drawworks.

6. In a drilling rig having three power-driven units and a plurality of engine units, the combination of: first and second multi-speed transmissions, means whereby the first multi-speed transmission may be driven by either one of two of said engine units, means whereby the second multi-speed transmission may be driven by either one of two of said engine units, whereby said multi-speed transmissions may be independently driven at different speeds, power-transmitting connections selectively operable to connect the first multi-speed transmission to drive either the first or third of said power-driven units, and additional power-transmitting connections selectively operable to connect the second multi-speed transmission to drive either the first or second of the power-driven units, whereby both multi-speed transmissions may operate conjointly to drive the first power-driven unit.

7. In a drilling rig having a drawworks, a slush pump, a rotary machine and a plurality of engine units, the combination of: first and second multi-speed transmissions, means whereby the first multi-speed transmission may be driven by either one of two of said engine units, means whereby the second multi-speed transmission may be driven by either one of two of said engine units, whereby said multi-speed transmissions may be independently driven at different speeds, power-transmitting connections selectively operable to connect the first multi-speed transmission to drive either the drawworks or the rotary machine, and additional power-transmitting connections selectively operable to connect the second multi-speed transmission to drive either the drawworks or the slush pump, whereby both multi-speed transmissions may operate conjointly to drive the drawworks.

8. In a drilling rig having two power-driven units and two engine units, the combination of: first and second multi-speed transmissions, first power-transmitting connections selectively operable to connect either of the engine units to drive either of the multi-speed transmissions, said first power-transmitting connections including independent drive means connecting each engine unit to one of said multi-speed transmissions, whereby said multi-speed transmissions may be independent driven at different speeds, second power-transmitting connections selectively operable to connect the first multi-speed transmission to drive the first of said power-driven units, and third power-transmitting connections selectively operable to connect the second multi-speed transmission to drive either of the power-driven units, whereby both engine units and both multi-speed transmissions may operate conjointly to drive the first power-driven unit.

9. In a drilling rig having three power-driven units and two engine units, the combination of: first and second multi-speed transmissions, first power-transmitting connections selectively operable to connect each of the engine units to drive one of the multi-speed transmissions, said first power-transmitting connections including independent drive means connecting each engine unit to one of said multi-speed transmissions, whereby said multi-speed transmissions may be independently driven at different speeds, second power-transmitting connections selectively operable to connect the first multi-speed transmission to drive either the first or third of said power-driven units, and third power-transmitting connections selectively operable to connect the second multi-speed transmission to drive either the first or second of the power-driven units, whereby both engine units and both multi-speed transmissions may operate conjointly to drive the first power-driven unit.

10. In a drilling rig having a drawworks, a slush pump, a rotary machine and two engine units, the combination of: first and second duplicate multi-speed transmissions, first power-transmitting connections selectively operable to connect either of the engine units to drive either of the multi-speed transmissions, said first power-transmitting connections including independent drive means connecting each engine unit to one of said multi-speed transmissions, whereby said multi-speed transmissions may be independently driven at different speeds, second power-transmitting connections selectively operable to connect the first multi-speed transmission to drive either the drawworks or the rotary machine, and third power-transmitting connections selectively operable to connect the second multi-speed transmission to drive either the drawworks or the slush pump, whereby both engine units and both multi-speed transmissions may operate conjointly to drive the drawworks.

11. In a drilling rig having three power-driven units and four engine units, the combination of: first and second duplicate multi-speed transmissions each having a power input member, means whereby the power input member of the first multi-speed transmission may be driven simultaneously by both the first and second engine units, means whereby the power input member of the second multi-speed transmission may be driven simultaneously by both the third and fourth engine units, whereby said multi-speed transmissions may be independently driven at different speeds, power-transmitting connections selectively operable to connect the first multi-speed transmission to drive either the first or third of said power-driven units, and additional power-transmitting connectons selectively operable to connect the second multi-speed transmission to drive either the first or second of the power-driven units, whereby both multi-speed transmissions may operate conjointly to drive the first power-driven unit.

FORREST J. YOUNG.

REFERENCES CITED

The following references are of record in the file of this patent:

UNITED STATES PATENTS

| Number | Name | Date |
|---|---|---|
| 1,526,976 | Gregory | Feb. 17, 1925 |
| 2,026,709 | Sheldon | Jan. 7, 1936 |
| 2,249,873 | Webster | July 22, 1941 |
| 2,282,597 | Archer | May 12, 1942 |
| 2,344,681 | Deschner | Mar. 21, 1944 |
| 2,405,546 | Archer | Aug. 13, 1946 |